(12) United States Patent
Baughman et al.

(10) Patent No.: US 11,789,685 B1
(45) Date of Patent: Oct. 17, 2023

(54) TRAINING AND USING A MACHINE LEARNING MODULE TO DETERMINE LOCALES AND AUGMENTED REALITY REPRESENTATIONS OF INFORMATION ON LOCALES TO RENDER IN AN AUGMENTED REALITY DISPLAY

(71) Applicant: INTERNATIONAL BUSINESS MACHINES CORPORATION, Armonk, NY (US)

(72) Inventors: Aaron K. Baughman, Cary, NC (US); Jeremy R. Fox, Georgetown, TX (US); Hernan A. Cunico, Holly Springs, NC (US); Martin G. Keen, Cary, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 17/823,013

(22) Filed: Aug. 29, 2022

(51) Int. Cl.
  *G06F 3/14* (2006.01)
  *G06N 20/00* (2019.01)
  *G06F 3/01* (2006.01)

(52) U.S. Cl.
  CPC ............. *G06F 3/14* (2013.01); *G06F 3/013* (2013.01); *G06N 20/00* (2019.01)

(58) Field of Classification Search
  CPC ............ G02B 27/017; G02B 27/0172; G02B 27/0176; G02B 2027/0178; G02B 2027/0174; G02B 2027/014; G02B 2027/0187; G06F 3/011; G06F 3/012; G06F 3/013; G06F 30/27; G06T 19/006; G06N 20/00; G06N 20/10; G06N 20/20; H04L 41/16; H04L 45/08; G16C 20/70;
  (Continued)

(56) References Cited

U.S. PATENT DOCUMENTS

| | | |
|---|---|---|
| 7,878,416 B2 | 2/2011 | Lapstun et al. |
| 8,606,497 B2 | 12/2013 | Doherty et al. |
| 9,690,373 B2 | 6/2017 | Haseltine |

(Continued)

OTHER PUBLICATIONS

Anonymous, "Delivery of AR Content When Travelling", IP.com, IP.com No. IPCOM000220220D, Jul. 25, 2012, pp. 3.
(Continued)

*Primary Examiner* — Koosha Sharifi-Tafreshi
(74) *Attorney, Agent, or Firm* — KONRAD RAYNES DAVDA & VICTOR LLP; David W. Victor

(57) ABSTRACT

Provided are a computer program product, system, and method for training and using a machine learning module to determine locales and augmented reality representations of information on locales to render in an augmented reality display. A determination is made of qualifying locales accessible to a visiting user during a user available time from a current location. Values for locale features of the qualifying locales and values of user features in a user profile of the visiting user are provided as input to a locale attraction machine learning module to determine local attraction scores for the qualifying locales. A determination is made of qualifying locales based on locale attraction scores of the qualifying locales to transmit to the visiting user computing device to cause an augmented reality display to render augmented reality representations of information on the qualifying locales.

17 Claims, 8 Drawing Sheets

(58) Field of Classification Search
CPC ... A61B 1/000096; G05B 2219/33002; H01M 8/04992; G01R 31/2846
See application file for complete search history.

(56) References Cited

U.S. PATENT DOCUMENTS

| | | | |
|---|---|---|---|
| 10,234,939 | B2 | 3/2019 | Miller et al. |
| 10,967,255 | B2 | 4/2021 | Rosado |
| 11,592,311 | B2 * | 2/2023 | Yoo .................. G06T 19/006 |
| 2016/0224862 | A1 | 8/2016 | Ashoori et al. |
| 2017/0076000 | A1 | 3/2017 | Ashoori et al. |
| 2018/0080774 | A1 * | 3/2018 | Sink .................. G06Q 10/10 |
| 2019/0251719 | A1 | 8/2019 | Wang et al. |
| 2019/0340537 | A1 * | 11/2019 | Fung .................. G06N 20/00 |
| 2019/0362219 | A1 | 11/2019 | Scheffler |
| 2020/0026776 | A1 | 1/2020 | Boss et al. |
| 2020/0320592 | A1 * | 10/2020 | Soule .................. G06F 3/013 |
| 2020/0402311 | A1 | 12/2020 | Trim et al. |
| 2021/0065405 | A1 | 3/2021 | Bissex et al. |

OTHER PUBLICATIONS

Anonymous, "Method and System for Facilitating Fast Collaborative Engagement of Users using Augmented Reality (AR)", IP.com, IP.com No. IPCOM000250397D, Jul. 11, 2017, pp. 3.

Bakhtiari Welcome To Hyperreality Where The Physical And Virtual Worlds Converge, Dec. 30, 2020, pp. 6, [online] [retrieve Dec. 30, 2021] https://www.forbes.com/sites/kianbakhtiari/2021/12/30/welcome-to-hype . . . .

Cifuentes, et al., "Augmented Reality Experiences in Therapeutic Pedagogy: A Study with Special Needs Students", IEEE, 2016 IEEE 16th International Conference on Advanced Learning Technologies, 2016, pp. 5 [online at https://ieeexplore.ieee.org/document/7757016].

Dubois, et al., "Augmented Reality Which Augmentation for Which Reality?", ACM, DARE 2000, Apr. 2000, pp. 2 [online at https://dl.acm.org/doi/10.1145/354666.354695].

Juan, et al., "Lessons learnt from an experience with an augmented reality iPhone learning game", ACM, ACE'2011, 2011, pp. 8 [online at https://dl.acm.org/doi/10.1145/2071423.2071488].

"Magnetism and Magnetic Fields", Boundless Physics, Course Hero, pp. 11, [online] https://www.coursehero.com/study-guides/boundless-physics/magnetism-and-magnetic-fields/.

Smith, et al., "Augmented Reality Sandpit Simulating Ant Colonies", IEEE, 2018, pp. 6 [online at https://ieeexplore.ieee.org/document/8551581].

Vanhooijdonk, "The Metaverse: blurring the lines between the physical and the virtual worlds", pp. 11, [online] [retrieved Jun. 23, 2022] https://blog.richardvanhooijdonk.com/en/the-metaverse-blurring-the-line . . . .

Vazques et al., "Serendipitous Language Learning in Mixed Reality", ACM, CHI'17 Extended Abstracts, May 2017, pp. 8 [online at 3) https://dl.acm.org/doi/10.1145/3027063.3053098].

Youtube, "Augmented Reality Sandpit Ant Colony Simulation", pp. 3, [online][retrieved Jun. 23, 2022] https://www.youtube.com/watch?v=63Kx_xVEZkk.

Zielkel, et al., "Exploring medical cyberlearning for work at the human technology frontier with the mixed-reality emotive virtual human system platform", IEEE, 2018, pp. 8 {online at https://ieeexplore.ieee.org/document/8401366].

Chague, et al., "Real Virtuality: A Multi-User Immersive Platform Connecting Real and Virtual Worlds", pp. 3, [online] [retrieved Aug. 29, 2022] https://www.researchgate.net/publication/293313811_Real_Virtuality_A_Multi-User_Immersive_Platform_Connecting_Real_and_Virtual_Worlds [also online at https://dl.acm.org/doi/10.1145/2927929.2927945].

* cited by examiner

Session Information

Input to Machine Learning Module

Locale Information

User Information

US 11,789,685 B1

TRAINING AND USING A MACHINE LEARNING MODULE TO DETERMINE LOCALES AND AUGMENTED REALITY REPRESENTATIONS OF INFORMATION ON LOCALES TO RENDER IN AN AUGMENTED REALITY DISPLAY

BACKGROUND OF THE INVENTION

1. Field of the Invention

The present invention relates to a computer program product, system, and method for training and using a machine learning module to determine locales and augmented reality representations of information on locales to render in an augmented reality display.

2. Description of the Related Art

Augmented reality (AR) smart glasses are wearable computer-capable glasses that generate digital information, such as three-dimensional images, text, animations, and videos, to overlay into the wearer's field of vision so the digital information is viewable along with real world scenes in the wearer's field of vision. Augmented reality is used to supplement information presented to users on items they are looking at, such as augmented reality controls to control items in the wearer's field of vision or information on locations in the field of vision.

There is a need in the art to provide improved techniques for deploying augmented reality representations to enhance user experiences.

SUMMARY

Provided are a computer program product, system, and method for training and using a machine learning module to determine locales and augmented reality representations of information on locales to render in an augmented reality display. A determination is made of qualifying locales accessible to a visiting user during a user available time from a current location of the visiting user. Values for locale features of the qualifying locales and values of user features in a user profile of the visiting user are provided as input to a locale attraction machine learning module to produce local attraction scores for the qualifying locales indicating measurements of attraction of the qualifying locales to the visiting user. The values for the locale features provide measurable properties of characteristics of the locales. A determination is made of qualifying locales based on locale attraction scores of the qualifying locales. Information on the qualifying locales is transmitted to the visiting user computing device to cause an augmented reality display to render augmented reality representations of information on the qualifying locales.

DETAILED DESCRIPTION

A person may look-up on their smartphone locations to visit when the have available time, such as venues, merchants, service providers, public spaces, etc., to determine what to engage. Described embodiments provide improvements to computer technology for generating augmented reality representations on suggesting locales for a user to engage. Described embodiments utilize databases of locale information, a machine learning module to determine locale attraction scores of nearby locales that are likely of interest and likely to provide a positive experience for the user, and patterns of behavior of interaction by similar users with locales to determine locales of interest for the user. Augmented reality representations of the locales likely to be of interest are rendered in an augmented reality display of the user to direct the user to the locales of likely interest and increase the likelihood of a serendipity moment.

Figure 1:
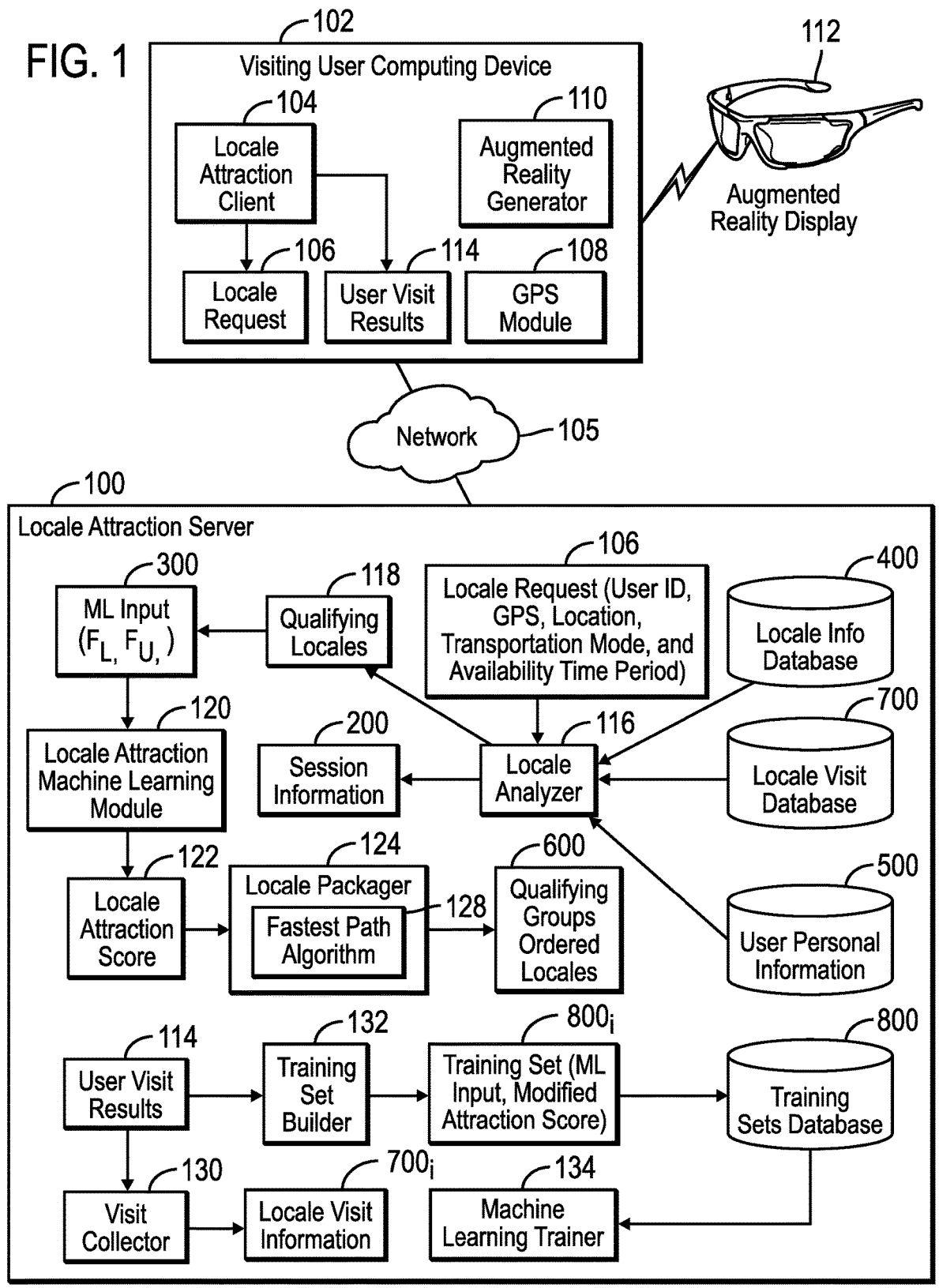
FIG. 1 illustrates an embodiment of a computing environment to provide augmented reality representations of information on locales for a user to visit.

FIG. 1 illustrates an embodiment of a locale attraction server 100 in communication with a visiting user computing device 102 over a network 105. There may be multiple user or visiting user computing devices 102, although only one is shown. The user computers 102 include a locale attraction client 104 to communicate a locale request 106 to the locale attraction server 100 for locales that would be of interest to the visiting user, including a current location, as provided by a Global Positioning Satellite (GPS) module 108, and a user available time period during which the visiting user is available to visit locales. The visiting user is requesting the locale attraction server 100 to provide information on locales that the user would likely be interested in visiting during available time. The user computers 102 include an augmented realty generator 110 to generate augmented reality representations of locales of interest, determined by the locale attraction server 100 in response to the locale request 106, in an augmented reality display 112.

In one embodiment, the augmented reality display 112 may comprise a type of computer vision glasses to render augmented reality images. The augmented reality display 112 may further comprise a gaze tracking device to receive a gazed image detected by eye tracking cameras that acquire the gazed image on which the tracked eye is fixed and information on coordinates of an axis of a line-of-sight, also referred to as sightline, visual axis, the user is viewing within the field of vision captured by the gaze tracking device tracking. The local attraction client 104 may return user visit results 114 concerning whether the user visited or did not visit locales whose information was rendered in the augmented reality display 112.

The locale attraction server 100 includes a locale analyzer 116 to receive the locale request 106, including a user identifier, current GPS location, transportation mode, e.g., auto, walking, public transport, taxi, etc., and availability time period the user has to visit locales. For the initial locale request 106, the locale analyzer 116 generates session information 200 (FIG. 2) having information on the visiting user locale request 106 and determines qualifying locales 118 the user can visit given their available time, transportation mode, and current location. The local analyzer 116 generates machine learning (ML) input 300 (FIG. 3), for each of the qualifying locales 118, including locale feature values ($F_L$) for features of the qualifying locale 118 from a locale information database 400 and user feature values ($F_U$) of features of the user from a user personal information database 500, and any other features having strong predictive qualities of locales a user would likely want to visit.

A locale may comprise a public area designated for a purpose, e.g., park with hiking trails, city park, golf course, tennis courts, a store, a shopping mall, an entertainment venue, service provider, such as doctor, etc., and any other locales a user can visit for which information is maintained in the locale information database 400.

The machine learning input 300 is provided to the locale attraction machine learning module 120 to produce a locale attraction score 122 for the qualifying locale 118 for which the machine learning input 300 is provided. A locale packager 124 receives the qualifying locales 118 and the locale attraction scores 122 for the qualifying locales 118 and packages them into qualifying groups 600 of one or more locales having highest locale attraction scores 122 that the user can visit within the user available time.

The local packager 124 may utilize a fastest path algorithm 128 to determine a fastest path among the qualifying locales in a qualifying group 600, wherein the qualifying locales packaged in the qualifying group 600 are ordered according to their position on the fastest path. Fastest paths may be computed as minimal-cost paths in a weighted directed graph of the qualifying locales in a group 600. The minimal-cost path algorithms may be a variant of the Dijkstra algorithm, the A* algorithm, and other path algorithms that further optimize the calculation. A qualifying group of locales 600 may be returned with information on the locales to the visiting user computing device 102 to use to render augmented reality representations of information on the locales in the group 600 and an order to visit them, based on the fastest path, in the augmented reality display 112. This augmented reality information may lure the user to the likely locales of interest in the qualifying group 600 in the fastest order.

Upon receiving the user visit results 114 from the locale attraction client 104 at the visiting user computing device 102, indicating the visited and not visited locales for which augmented reality information was presented, a visit collector 130 generates locale visit information $700_i$ having information on the visit to a locale, such as duration of visit, to store in the locale visit database 700. A training set builder 132 processes the user visit results 114 to generate a training set $800_i$ for each locale indicated in the results, including the machine learning input used to generate the attraction score for the locale and an adjusted attraction score comprising the original calculated attraction score 122 adjusted to reflect whether the user visited or did not visit the locale for which augmented reality representations were generated. For instance, if the user visited the locale, then the adjusted attraction score would indicate a higher level of user attraction to reflect the visit. If the user did not visit the highlighted locale, then the attraction score is adjusted lower to reflect less user attraction to the locale. The training set $800_i$ is stored in the training set database 800.

A machine learning trainer 134 may periodically access training sets $800_i$ from the training set database 800 to use to train the locale attraction machine learning module 120 by forming an input set, such as a matrix, of the machine learning inputs used to produce the previously calculated attraction scores, and form an output set of the adjusted locale attraction scores from the training sets $700_i$, such as a vector. The locale attraction machine learning module 120 is then trained with the input set to produce the output set of adjusted locale attraction scores reflecting whether the user decided to visit or not visit the locale for which augmented reality representations were presented.

The network 105 may comprise a network such as a Storage Area Network (SAN), Local Area Network (LAN), Intranet, the Internet, Wide Area Network (WAN), peer-to-peer network, wireless network, arbitrated loop network, etc.

The arrows shown in FIG. 1 between the components and objects in the locale attraction server 100 and the user computing device 102 represent a data flow between the components.

In certain embodiments, the locale attraction machine learning module 120 may use machine learning and deep learning algorithms, such as decision tree learning, association rule learning, neural network, inductive programming logic, support vector machines, Bayesian network, etc. For artificial neural network program implementations, the neural network may be trained using backward propagation to adjust weights and biases at nodes in a hidden layer to produce their output based on the received inputs. In backward propagation used to train a neural network machine learning module, biases at nodes in the hidden layer are adjusted accordingly to produce the locale attraction scores having specified confidence levels based on the input parameters. For instance, the input 300 to the locale attraction machine learning module 120 is processed to produce a locale attraction score 122 with a confidence level. The locale attraction machine learning module 120 may be trained to produce the locale attraction scores 122 based on the inputs 300 from the training sets $700_i$. Backward propagation may comprise an algorithm for supervised learning of artificial neural networks using gradient descent. Given an artificial neural network and an error function, the method may use gradient descent to find the parameters (coefficients) for the nodes in a neural network or function that minimizes a cost function measuring the difference or error between actual and predicted values for different parameters. The parameters are continually adjusted during gradient descent to minimize the error.

In backward propagation used to train a neural network machine learning module, such as the locale attraction machine learning module 120, margin of errors are determined based on a difference of the calculated predictions and user rankings of the output. Biases (parameters) at nodes in the hidden layer are adjusted accordingly to minimize the margin of error of the error function.

In an alternative embodiment, the locale attraction machine learning module 120 may be implemented not as a machine learning module, but implemented using a rules based system to determine the outputs from the inputs. The locale attraction machine learning module 120 may further be implemented using an unsupervised machine learning module, or machine learning implemented in methods other than neural networks, such as multivariable linear regression models.

Generally, program modules, such as the program components 104, 108, 110, 116, 120, 124, 128, 130, 132, and 134 may comprise routines, programs, objects, components, logic, data structures, and so on that perform particular tasks or implement particular abstract data types. The program components and hardware devices of the computing devices 100 and 102 of FIG. 1 may be implemented in one or more computer systems, where if they are implemented in multiple computer systems, then the computer systems may communicate over a network.

The program components 104, 108, 110, 116, 120, 124, 128, 130, 132, and 134 may be accessed by a processor from memory to execute. Alternatively, some or all of the program components 104, 108, 110, 116, 120, 124, 128, 130, 132, and 134 may be implemented in separate hardware devices, such as Application Specific Integrated Circuit (ASIC) hardware devices.

The functions described as performed by the program 104, 108, 110, 116, 120, 124, 128, 130, 132, and 134 may be implemented as program code in fewer program modules than shown or implemented as program code throughout a greater number of program modules than shown.

The program components described as implemented in the locale attraction server 100 may be implemented in the user computer 102.

The user computer 102 may comprise a personal computing device, such as a laptop, desktop computer, tablet, smartphone, etc. The server 100 may comprise one or more server class computing devices, or other suitable computing devices. Alternatively, the user computer 102 may be embedded in the augmented reality display 112.

Figure 2:
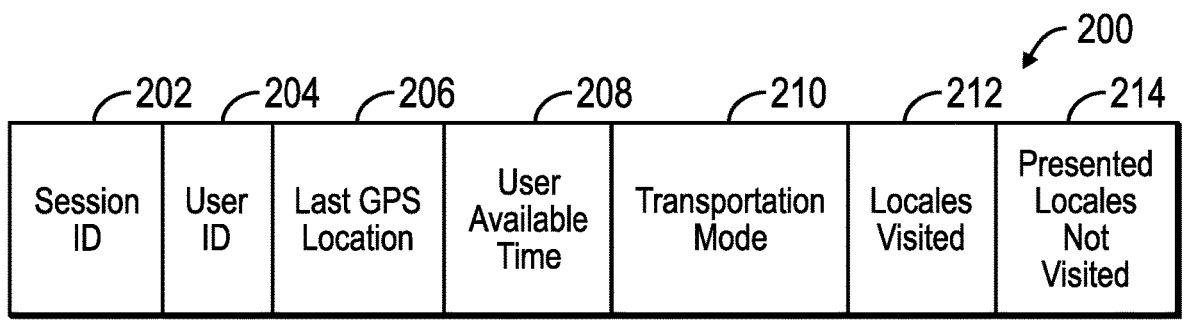
FIG. 2 illustrates an embodiment of session information of a session during which augmented reality representations of information on locales is presented to a user to visit.

FIG. 2 illustrates an embodiment of session information 200, generated when the locale attraction client 104 submits the initial request for locales of interest to visit, and includes: a unique session identifier (ID) 202; a user ID 204; a last GPS location 206 reported by the visiting user computing device 102; a user available time 208 remaining from the initial user availability time period reported in the initial locale request 106, which may comprise a timer initially set to the user availability time period in the locale request 106 that continually decrements as time passes; a transportation mode 210 being used by the visiting user, such as automobile, walking, taxi/ride sharing, public transport, etc.; locales visited 212 that the visiting user has visited during the session 200; and presented locales not visited 214 for which augmented reality representations of information were generated in a frame or body of the augmented reality display.

Figure 3:
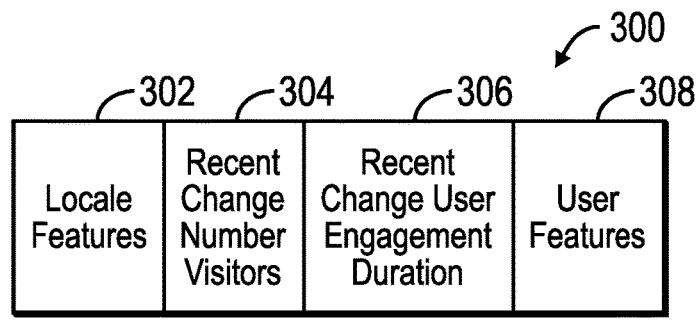
FIG. 3 illustrates an embodiment of input to a locale attraction machine learning module to produce a locale attraction score for a locale.

FIG. 3 illustrates an embodiment of the machine learning input 300 as including, for a locale for which a locale attraction score is to be calculated: locale feature values ($F_L$) 302 for a locale from the locale information database 400, e.g., type of venue, services offered, goods sold, reviews, metadata tags, likely demographics interested and visiting, entertainment offered; recent change in number of visitors 304 that have visited; and recent change in user engagement duration by visitors 306; and user feature values ($F_U$) 308 from the visiting user personal information database 500, such as user interests, bio-medical and demographic information, expressed likes and dislikes, profession, etc., and any other features or information that have strong prediction of the attraction a user would have toward a locale.

In one embodiment, the recent change information 304, 306 may be generated when generating the machine learning input 300 and include changes in visitor patterns for visitors having similar user profiles to the user profile of the visiting user initiating the request 106.

Figure 4:
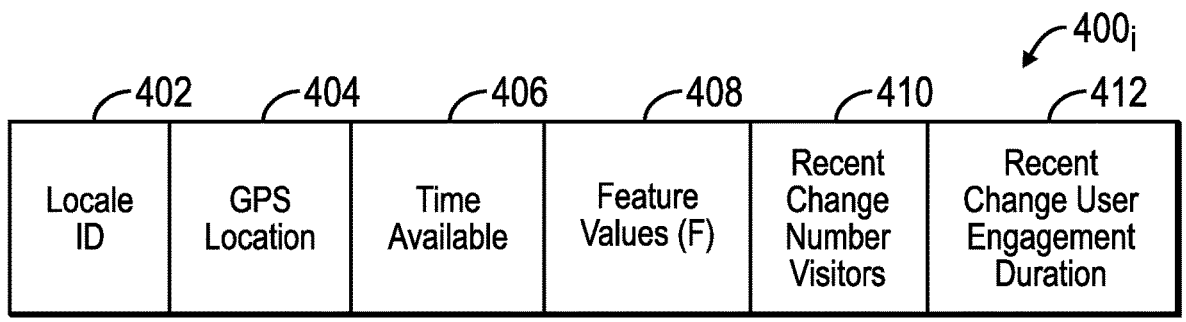
FIG. 4 illustrates an embodiment of locale information on a locale a user may visit.

FIG. 4 illustrates an embodiment of locale information instance $400_i$ maintained for a locale i in the locale information database 400, and may include: a locale ID 402; a GPS location 404 of the locale; a time available 406 of when the locale is open and available; feature values ($F_L$) 408 of the locale, e.g., type of venue, services offered, goods sold, reviews, metadata tags, likely demographics interested and visiting, entertainment offered; recent change in number of visitors 410 that have visited; and recent change in user engagement duration by visitors 412, etc.

Figure 5:
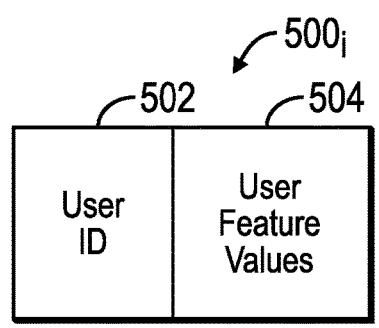
FIG. 5 illustrates an embodiment of user information of a user to receive augmented reality representations of information on locales to visit.

FIG. 5 illustrates an embodiment of user information $500_i$ in the user information database 500, and may include a user ID 502 and user feature values ($F_U$) 504 such as user interests, bio-medical and demographic information, expressed likes and dislikes, profession, etc., and any other features or information that have strong prediction of the attraction a user would have toward a locale.

Figure 6:
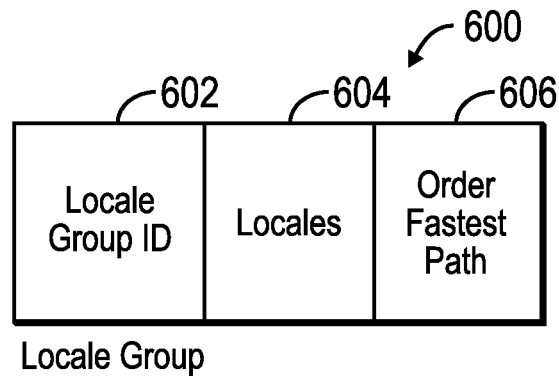
FIG. 6 illustrates an embodiment of a locale group of one or more locales for which augmented reality representation of information is to be rendered in a visiting user augmented reality display.

FIG. 6 illustrates a locale group 600 formed by the locale packager 124, and includes: a locale group ID 602; one or more qualifying locales 604 included in the group; and an order of the fastest path 608 from a last GPS location 206 to the one or more locales 604 and optionally to an end node or point the visiting user wants to be after visiting the locales 604.

Figure 7:
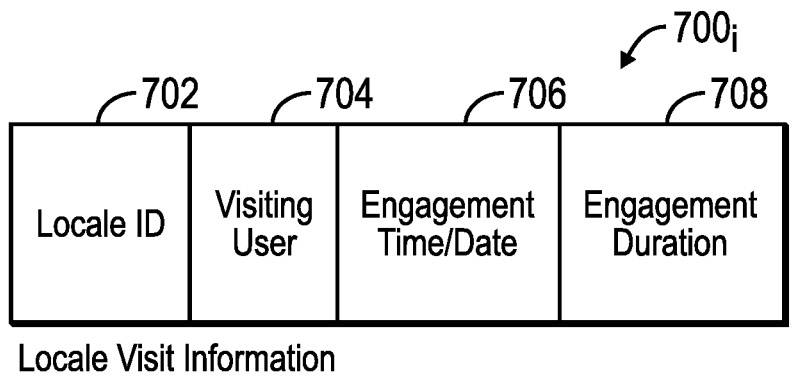
FIG. 7 illustrates an embodiment of locale visit information on a user visit to a locale for which augmented reality information was rendered in the user augmented reality display.

FIG. 7 illustrates an embodiment of locale visit information $700_i$ in the locale visit database 700 generated by the visit collector 130 on a locale the visiting user visited, and may include: a locale ID 702; a visiting user ID 704 that visited the locale 702; an engagement time/date 706 the visiting user visited the locale 702; and an engagement duration 708 of time the visiting user was engaged at the locale 702.

Figure 8:
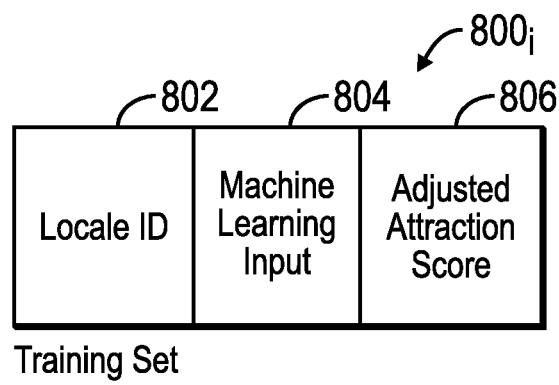
FIG. 8 illustrates an embodiment of a training set of machine learning input and an adjusted attraction score to use to retrain the locale attraction machine learning module based on whether a user visited a locale for which augmented reality representations of information was presented.

FIG. 8 illustrates an embodiment of a training set $800_i$ generated by the training set builder 132 that may include: a locale ID 802; the machine learning input 804, comprising information in input 300, used by the locale attraction machine learning module 120 to generate a locale attraction score 122; and an adjusted attraction score 806 that adjusts the generated locale attraction score 122 upwards or downwards based on whether the visiting user visited the locale 802.

Figure 9:
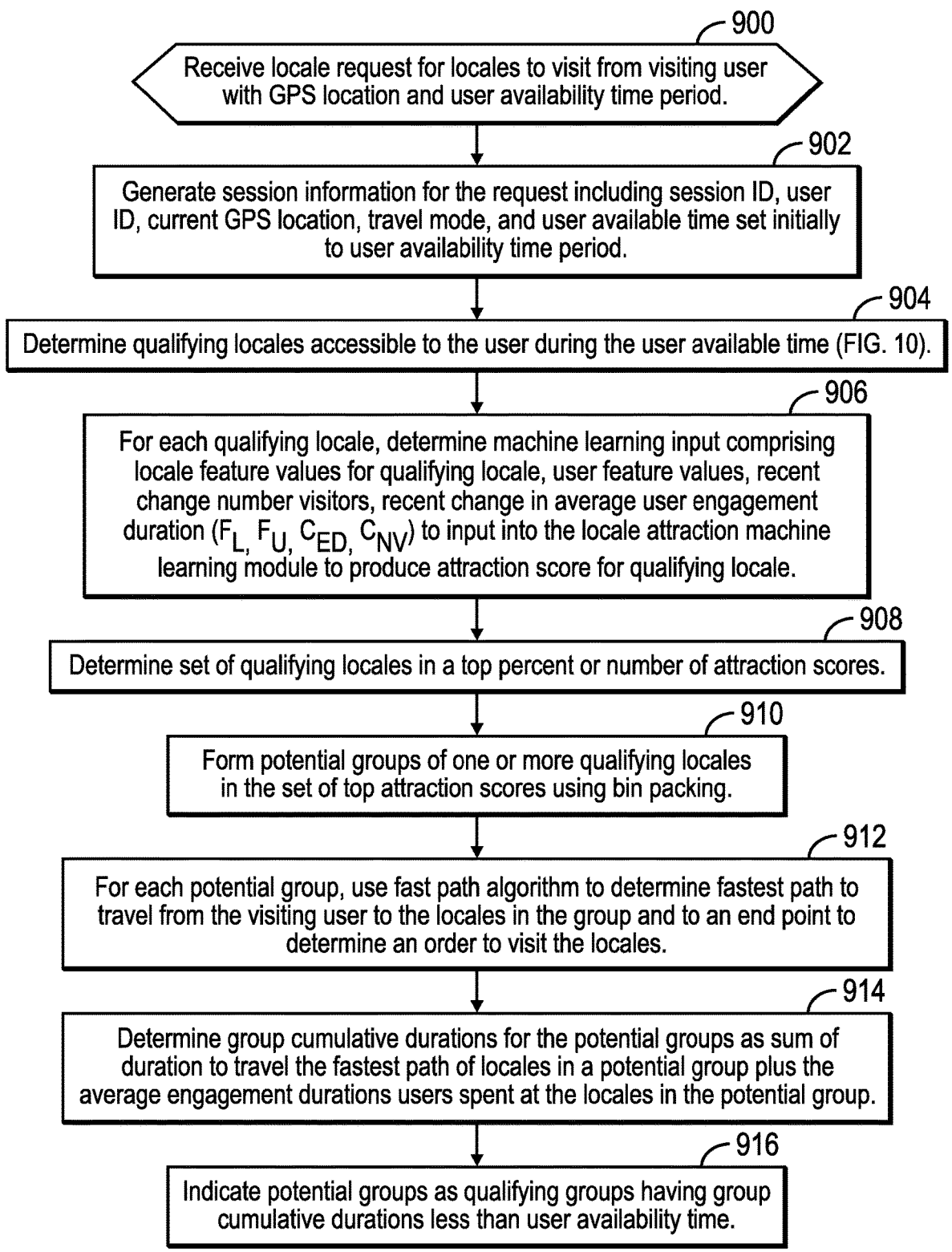
FIG. 9 illustrates an embodiment operations to process a locale request from a user for locales to visit during a user available time and provide augmented reality representations of information on locales to visit in the user augmented reality display.
Figure 10:
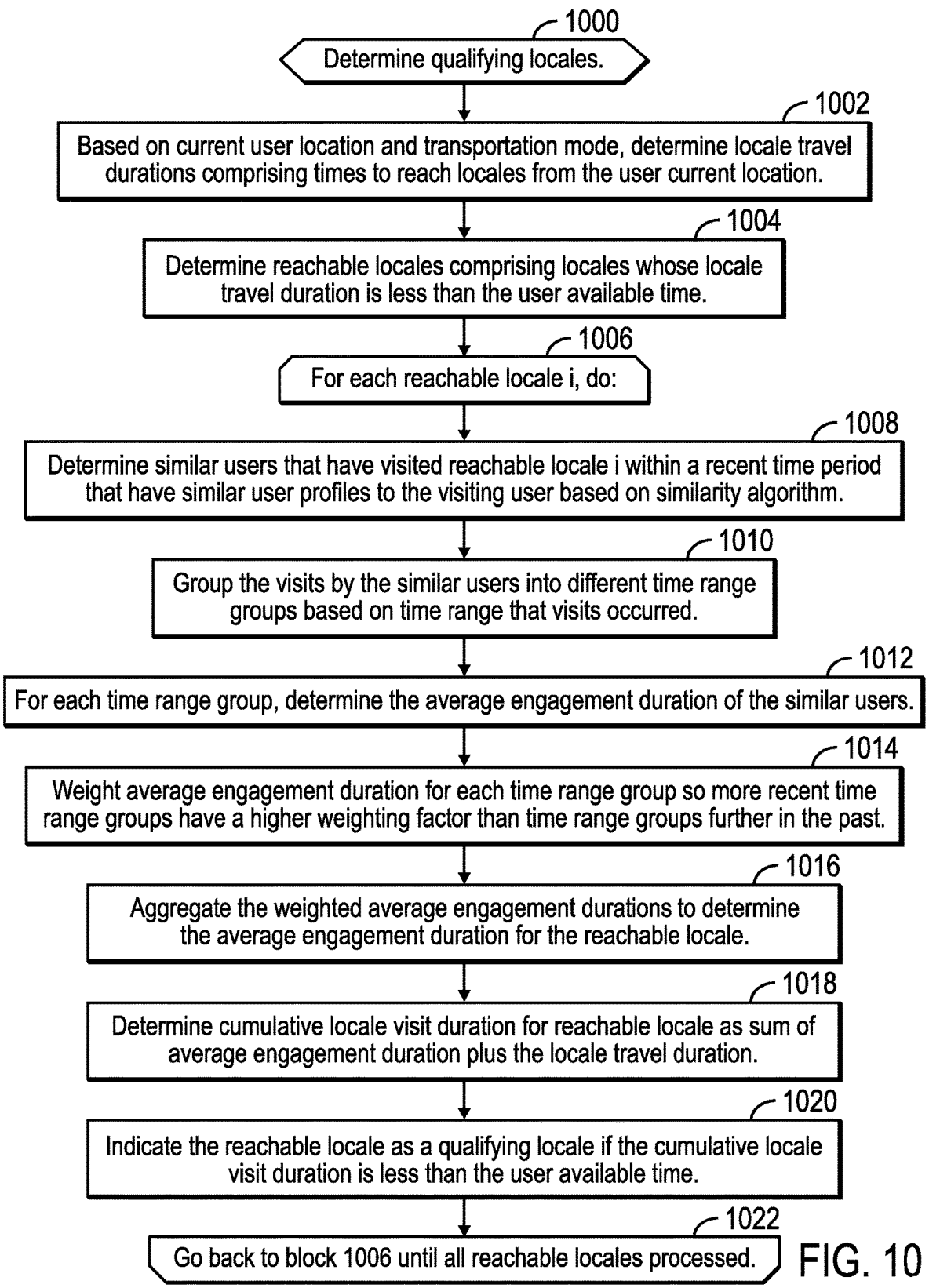
FIG. 10 illustrates an embodiment of operations to determine qualifying locales the user may visit during available time.

FIG. 9 illustrates an embodiment of operations performed by the locale analyzer 116 and the locale packager 124 to generate qualifying groups 600 of locales to provide to the visiting user computing device 102 to render augmented reality information on locales 604 in the group 600 in the augmented reality display 112. Upon receiving (at block 900) a locale request 106 for locales to visit, including the GPS location of the visiting user from the GPS module 108 and a user availability time period the user has to visit locales, the locale analyzer 116 generates (at block 902) session information 200 for the request, including session ID 202, user ID 204, last GPS location of visiting user, user available time 208 comprising a timer initially set to the user availability time period in the request, and a transportation mode 210 of the visiting user, e.g., walking, automobile, ride sharing, public transportation, etc. If the user availability time period is in the future, then the user available time 208, or timer, would be set to start decrementing at the beginning of the user availability time period in the request 106. The locale analyzer 116 determines (at block 904) qualifying locales 118 accessible during the user available time 208. FIG. 10 provides further detailed operations for determining the qualifying locales 118 the user has time to visit within the user available time 208.

The locale analyzer 116 determines (at block 906), for each qualifying locale 118, machine learning input 300 comprising locale feature values ($F_L$) 302 for the qualifying locale from the locale information $400_i$ for the qualifying locale; a recent change number of visitors ($C_{NV}$) 304 from the field 410 in the locale information $400_i$ for the locale; recent change in average user engagement duration ($C_{ED}$) at the locale from field 412 in the in the locale information $400_i$ for the locale; and user feature values ($F_U$) 310 from field 504 in the user information $500_i$. This machine learning input 300 is provided to the locale attraction machine learning module 120 to produce the attraction score 122 for the qualifying locale 118. The locale analyzer 116 determines (at block 908) a set of qualifying locales 118 in a top percent or top number of attraction scores 122.

The locale packager 124 forms (at block 910) potential groups of one or more qualifying locales 118 in the set of top locale attraction scores 122 using a bin packing algorithm. For each potential group, the fastest path algorithm 128 determines (at block 912) a fastest path to travel from the visiting user to the locales in the group and, optionally, to an end point the visiting user wants to be, to determine an order in which to visit the qualifying nodes in the potential group, when there are a plurality of qualifying nodes in the potential group. The locale packager 124 determines (at block 914) group cumulative durations for the potential groups as sum of duration to travel the fastest path in a potential group plus the average engagement durations of users who have visited the locales in the potential group. Potential groups having group cumulative durations less than the current user available time 208 are indicated (at block 916) as qualifying groups 600 of locales the user has time to visit.

With the embodiment of FIG. 9, machine learning is used to determine locale attraction scores to rank locales and form groups of locales that a user can visit within the remaining user available time to visit locales. Information on the locales of the qualifying groups are then sent to the visiting user computing device 102 to control an augmented reality generator 110 to generate augmented reality representations, in the augmented reality display 112, of information on the locales in the qualifying group and an order in which the locales should be visited. This information will guide the user toward those locales the user is most likely to want to visit given the features of the visiting user and the locales, and thus increase the chance for positive serendipity moments the user will experience while visiting the locales under the guidance of the augmented reality display 112.

Figure 11:
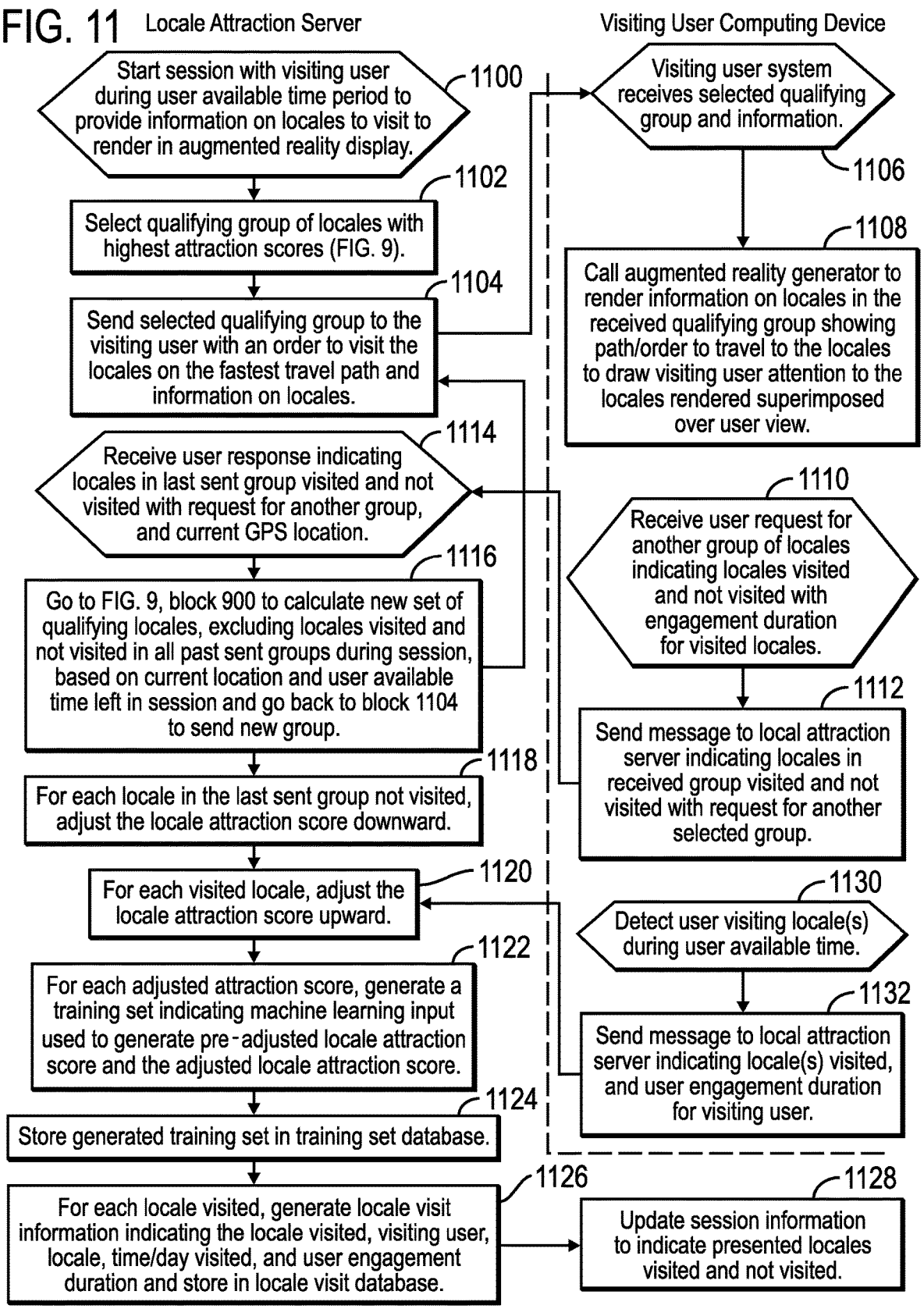
FIG. 11 illustrates an embodiment of operations for a locale attraction server and user computing device to interact to render augmented reality information on locales for a user to visit in a user augmented reality display.

In the embodiment of FIGS. 9 and 11, information on qualifying groups of qualifying locales is determined to send the information on the qualifying groups to the user computing device 102. In an alternative embodiment, information on qualifying locales may be sent to the user computing device 102 to render augmented reality representations on the qualifying locales without determining qualifying groups of qualifying locales.

FIG. 10 illustrates an embodiment of operations performed by the locale analyzer 116 to determine qualifying locales at block 904 in FIG. 9. Upon initiating (at block 1000) the operations to determine qualifying locales 118, the fastest path algorithm 128 determines (at block 1002), based on the current user location 206 and transportation mode 210, locale travel durations comprising times to reach the locale from the user current location 206. The locale travel duration may further include a time to travel from the locale to a user designated end point. The locale analyzer 116 determines (at block 1004) reachable locales comprising locales whose local travel duration is less than the user available time 208, i.e., how much time remaining for the user to visit locales, which is constantly declining over time. A loop of operations is performed at blocks 1006 through 1022 for each reachable locale to determine whether it may be a qualifying locale. For a reachable locale, the locale analyzer 116 determines (at block 1008) similar users that have visited the reachable locale i within a recent time period, e.g., last number of days, last week, last month, etc., that have similar user profiles to the visiting user based on a similarity algorithm, such as a data mining similarity algorithm. The user feature values 504 of the visiting user and the users that have recently visited the locale may be compared for similarity.

The visits by the similar users are grouped (at block 1010) into different time range groups based on the time range that visits occurred, e.g., in last day, last number of days, last week, last month, etc. For each time range group, a determination is made (at block 1012) of the average engagement duration of the similar users at the locale during the time range of the time range group. The average engagement duration for each time range group is weighted (at block 1016) so more recent groups have a higher weighting factor than groups further in the past. This reflects that more recent visitors provide better prediction of interest and time spent than visitors in the more distant past. A cumulative locale visit duration is determined (at block 1018) for the reachable locale as a sum of the average engagement duration plus the locale travel duration, to factor in both the time to travel to the locale and time the user will likely want to spend at the locale for an optimal experience. The reachable locale is indicated (at block 1020) as a qualifying locale if the cumulative locale visit duration is less than the user available time 208.

With the embodiment of FIG. 10, a qualifying locale is determined if the estimated time spent to travel to the locale and the estimated engagement duration at the locale is within the user available time. Further, to provide a more accurate average user engagement duration, only the engagement durations of users having similar profiles and feature values to the visiting user are considered, under the presumption that similar users to the visiting user are likely to better reflect the user engagement duration at the locale for this particular visiting user than time spent at the locale by users with different features, interests, and profiles. For instance, if similar users to the visiting user spend less time at the locale than users in general, then the locale may comprise a qualifying locale based on the engagement duration by similar users, but not be qualifying based on engagement duration by dissimilar users.

FIG. 11 illustrates interaction of the locale attraction server 100 and the visiting user computing device 102 to provide the visiting user information on locales the user is likely to want to be engaged during available time. Upon the locale analyzer 116 initiating a session 200 with a visiting user during user available time period to provide information on locales to visit to render in the augmented reality display 112, the locale analyzer 116 performs the operations in FIG. 9 to select (at block 1102) a qualifying group 600 of locales to visit. The selected qualifying group is sent (at block 1104) to the visiting user computing device 102 with an order to visit the locales on the fastest travel path and information on the locales in the group 600.

Upon the locale attraction client 104 at the visiting user computing device 102 receiving (at block 1106) the group of locales and information on the locales, the augmented reality generator 110 is called (at block 1108) to render the information on the locales in the group in the augmented reality display 112 showing the path/order to travel to the locales to draw the visiting user to the locale in the real world. Augmented reality representations of information on locales may provide information on what is currently happening at the locale, number of visitors, services/products offered, etc.

If the visiting user has decided not to visit the locales having augmented reality information rendered in the augmented reality display 112, then the visiting user may request (at block 1110), during the user available time, another group of locales that indicates locales visited and not visited with the user engagement duration of the visited locales. This request is sent (at block 1112) to the locale attraction server 100. Upon receiving (at block 1114) the request at block 1112, which also may include the current GPS location, the locale analyzer 116 proceeds (at block 1116) to FIG. 9, block 900 to calculate a new set of qualifying locales, excluding locales visited and not visited in all past sent groups during the session 200, based on last GPS location 206 and user available time 208 left in the session 200, and proceeds to block 1104 to send the new group. In this way, over time within the user available time 208, the qualifying locales are re-determined because there may not be sufficient time to visit and engage certain locales that previously qualified with more time remaining.

After determining (at block 1116) the new qualifying locales, for each locale indicated in the response in the last sent group as not visited, the locale attraction scores 122 for those locales are adjusted (at block 1118) downward to reflect less user interest/attraction for those not visited locales. For each visited locale, the locale analyzer 116 adjusts (at block 1120) the locale attraction score upward to reflect the continued attraction/interest in the locale. For each adjusted attraction score, the training set builder 132 generates (at block 1122) a new training set $800_i$ indicating machine learning input 804 used to generate the pre-adjusted locale attraction score 122 and the adjusted locale attraction score based on whether the user recently visited or did not visit the locale for which augmented reality information was rendered in the augmented reality display 112. The generated training sets $800_i$ are stored (at block 1124) in the training set database 800.

For each locale visited, the locale analyzer 116 generates (at block 1126) locale visit information $700_i$ indicating the locale visited 702, visiting user 704, time/day visited 706, and user engagement duration 708 at the locale and stores the generated locale visit information $700_i$ in locale visit database 700. The session information 200 is updated (at block 1128) to indicate the locales visited in field 212 and to indicate the locales, for which augmented reality information was generated, as not visited 214.

Upon the locale attraction client 104 detecting (at block 1130) that the user visited a locale during the available time, a message is sent (at block 1132) to the local attraction server 100 indicating locale(s) visited and user engagement duration at the locales visited. The locale analyzer 116 upon receiving the information sent, may perform the operations at block 1120 et seq to process the information on a locale that was visited.

With the embodiment of FIG. 11, the user computing device 102 interacts with the locale attraction server 100 to provide information on locales visited and locale engagement duration. The locale attraction server 100 may use this information to generate training sets to train the locale attraction machine learning module 120 to improve the machine learning predictability about user attraction to a locale, and update information to determine further groups of locales if requested during the user available time.

Figure 12:
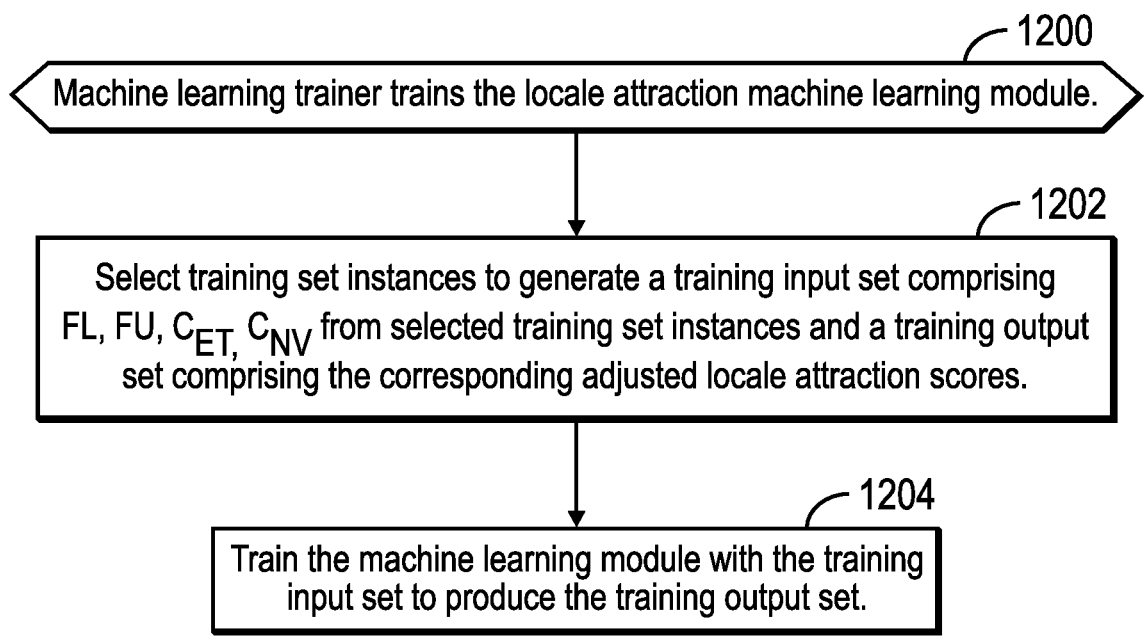
FIG. 12 illustrates an embodiment of operations to retrain the locale attraction machine learning module based on expressed user preference for locales for which augmented reality information was presented.

FIG. 12 illustrates an embodiment of operations performed by the machine learning trainer 134 to train the locale attraction machine learning module 120 with the generated training sets $800_i$. Upon initiating (at block 1200) a training operation, the machine learning trainer 134 selects (at block 1202) training set instances $800_i$ to generate a training input set comprising the machine learning input 804 from selected training set instances $800_i$, in a matrix or matrices, and a training output set comprising the corresponding adjusted attraction scores 806, which may comprise a vector. The machine learning trainer 134 trains the locale attraction machine learning module 120 with the training input set to produce the training output set to update parameter values, biases and weights for the nodes in the locale attraction machine learning module 120.

The present invention may be a system, a method, and/or a computer program product. The computer program product may include a computer readable storage medium (or media) having computer readable program instructions thereon for causing a processor to carry out aspects of the present invention.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 1300 contains an example of an environment for the execution of at least some of the computer code 1301 involved in performing the inventive methods, such as the locale analyzer 116, locale attraction machine learning module 120, locale packager 124, fastest path algorithm 128, visit collector 130, training set builder 132, and machine learning trainer 134 (FIG. 1).

In addition to block 1301, computing environment 1300 includes, for example, computer 1301, wide area network (WAN) 1302, end user device (EUD) 1303, remote server 1304, public cloud 1305, and private cloud 1306. In this embodiment, computer 1301 includes processor set 1310 (including processing circuitry 1320 and cache 1321), communication fabric 1311, volatile memory 1312, persistent storage 1313 (including operating system 1322 and block 1301, as identified above), peripheral device set 1314 (including user interface (UI) device set 1323, storage 1324, and Internet of Things (IoT) sensor set 1325), and network module 1315. Remote server 1304 includes remote database 1330. Public cloud 1305 includes gateway 1340, cloud orchestration module 1341, host physical machine set 1342, virtual machine set 1343, and container set 1344.

Figure 13:
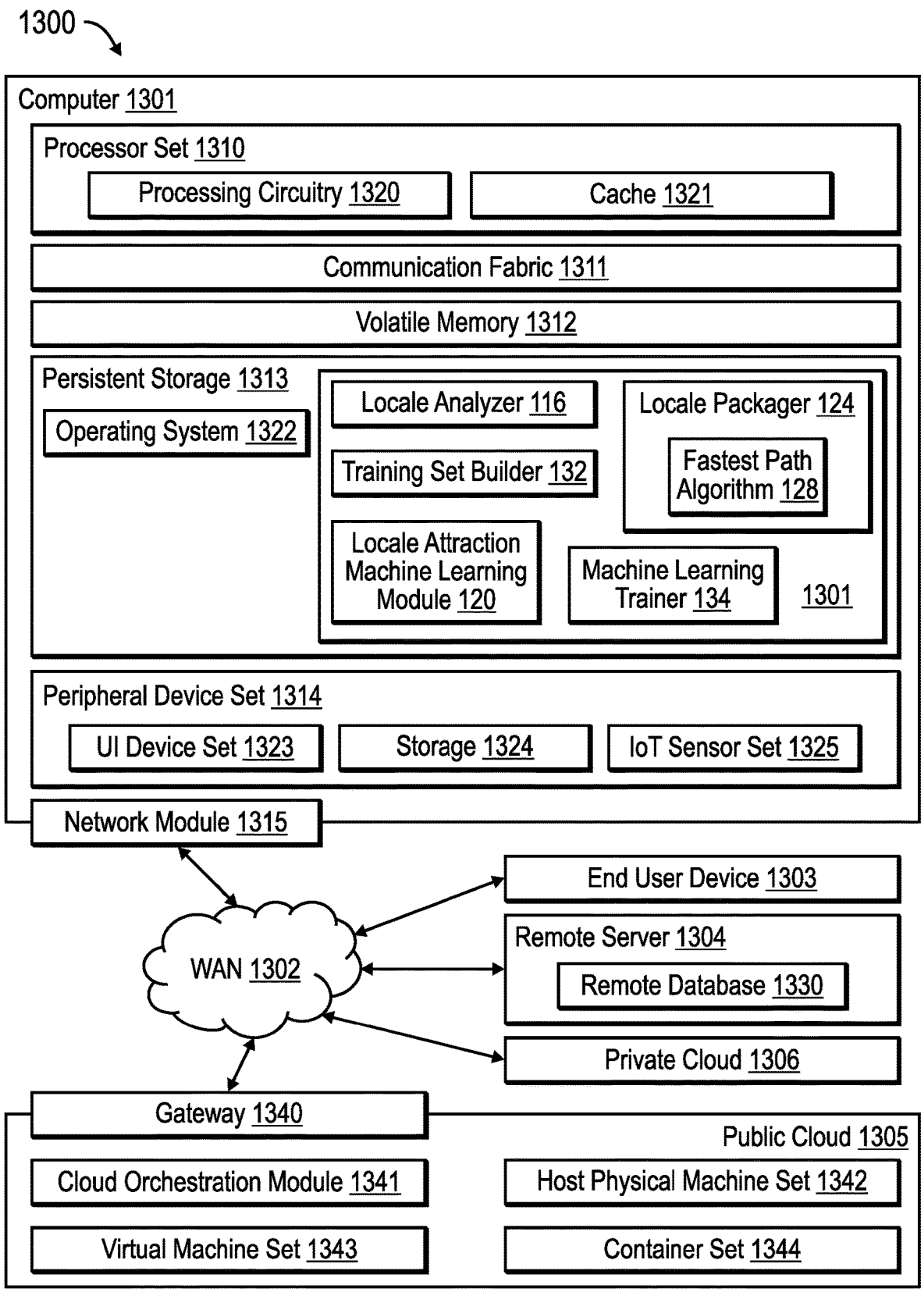
FIG. 13 illustrates a computing environment in which the components of FIG. 1 may be implemented.

COMPUTER 1301 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 1330. As is well understood in the art of computer technology, and depending upon the technology, performance of a computer-implemented method may be distributed among multiple computers and/or between multiple locations. On the other hand, in this presentation of computing environment 1300, detailed discussion is focused on a single computer, specifically computer 1301, to keep the presentation as simple as possible. Computer 1301 may be located in a cloud, even though it is not shown in a cloud in FIG. 13. On the other hand, computer 1301 is not required to be in a cloud except to any extent as may be affirmatively indicated.

PROCESSOR SET 1310 includes one, or more, computer processors of any type now known or to be developed in the future. Processing circuitry 1320 may be distributed over multiple packages, for example, multiple, coordinated integrated circuit chips. Processing circuitry 1320 may implement multiple processor threads and/or multiple processor cores. Cache 1321 is memory that is located in the processor chip package(s) and is typically used for data or code that should be available for rapid access by the threads or cores running on processor set 1310. Cache memories are typically organized into multiple levels depending upon relative proximity to the processing circuitry. Alternatively, some, or all, of the cache for the processor set may be located "off chip." In some computing environments, processor set 1310 may be designed for working with qubits and performing quantum computing.

Computer readable program instructions are typically loaded onto computer 1301 to cause a series of operational steps to be performed by processor set 1310 of computer 1301 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 1321 and the other storage media discussed below. The program instructions, and associated data, are accessed by processor set 1310 to control and direct performance of the inventive methods. In computing environment 1300, at least some of the instructions for performing the inventive methods may be stored in persistent storage 1313.

COMMUNICATION FABRIC 1311 is the signal conduction path that allows the various components of computer 1301 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 1312 is any type of volatile memory now known or to be developed in the future. Examples include dynamic type random access memory (RAM) or static type RAM. Typically, volatile memory 1312 is characterized by random access, but this is not required unless affirmatively indicated. In computer 1301, the volatile memory 1312 is located in a single package and is internal to computer 1301, but, alternatively or additionally, the volatile memory may be distributed over multiple packages and/or located externally with respect to computer 1301.

PERSISTENT STORAGE 1313 is any form of non-volatile storage for computers that is now known or to be developed in the future. The non-volatility of this storage means that the stored data is maintained regardless of whether power is being supplied to computer 1301 and/or directly to persistent storage 1313. Persistent storage 1313 may be a read only memory (ROM), but typically at least a portion of the persistent storage allows writing of data, deletion of data and re-writing of data. Some familiar forms of persistent storage include magnetic disks and solid state storage devices. Operating system 1322 may take several forms, such as various known proprietary operating systems or open source Portable Operating System Interface-type operating systems that employ a kernel. The code included in block 1301 typically includes at least some of the computer code involved in performing the inventive methods.

PERIPHERAL DEVICE SET 1314 includes the set of peripheral devices of computer 1301. Data communication connections between the peripheral devices and the other components of computer 1301 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 1323 may include components such as a display screen, speaker, microphone, wearable devices (such as goggles and smart watches), keyboard, mouse, printer, touchpad, game controllers, and haptic devices. Storage 1324 is external storage, such as an external hard drive, or insertable storage, such as an SD card. Storage 1324 may be persistent and/or volatile. In some embodiments, storage 1324 may take the form of a quantum computing storage device for storing data in the form of qubits. In embodiments where computer 1301 is required to have a large amount of storage (for example, where computer 1301 locally stores and manages a large database) then this storage may be provided by peripheral storage devices designed for storing very large amounts of data, such as a storage area network (SAN) that is shared by multiple, geographically distributed computers. IoT sensor set 1325 is made up of sensors that can be used in Internet of Things applications. For example, one sensor may be a thermometer and another sensor may be a motion detector.

NETWORK MODULE 1315 is the collection of computer software, hardware, and firmware that allows computer 1301 to communicate with other computers through WAN 1302. Network module 1315 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 1315 are performed on the same physical hardware device. In other embodiments (for example, embodiments that utilize software-defined networking (SDN)), the control functions and the forwarding functions of network module 1315 are performed on physically separate devices, such that the control functions manage several different network hardware devices. Computer readable program instructions for performing the inventive methods can typically be downloaded to computer 1301 from an external computer or external storage device through a network adapter card or network interface included in network module 1315.

WAN 1302 is any wide area network (for example, the internet) capable of communicating computer data over non-local distances by any technology for communicating computer data, now known or to be developed in the future. In some embodiments, the WAN 1302 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 1303 is any computer system that is used and controlled by an end user (for example, a customer of an enterprise that operates computer 1301), and may take any of the forms discussed above in connection with computer 1301. EUD 1303 typically receives helpful and useful data from the operations of computer 1301. For example, in a hypothetical case where computer 1301 is designed to provide a recommendation to an end user, this recommendation would typically be communicated from network module 1315 of computer 1301 through WAN 1302 to EUD 1303. In this way, EUD 1303 can display, or otherwise present, the recommendation to an end user. In some embodiments, EUD 1303 may be a client device, such as thin client, heavy client, mainframe computer, desktop computer and so on.

REMOTE SERVER 1304 is any computer system that serves at least some data and/or functionality to computer 1301. Remote server 1304 may be controlled and used by the same entity that operates computer 1301. Remote server 1304 represents the machine(s) that collect and store helpful and useful data for use by other computers, such as computer 1301. For example, in a hypothetical case where computer 1301 is designed and programmed to provide a recommendation based on historical data, then this historical data may be provided to computer 1301 from remote database 1330 of remote server 1304.

PUBLIC CLOUD 1305 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 1305 is performed by the computer hardware and/or software of cloud orchestration module 1341. The computing resources provided by public cloud 1305 are typically implemented by virtual computing environments that run on various computers making up the computers of host physical machine set 1342, which is the universe of physical computers in and/or available to public cloud 1305. The virtual computing environments (VCEs) typically take the form of virtual machines from virtual machine set 1343 and/or containers from container set 1344. It is understood that these VCEs may be stored as images and may be transferred among and between the various physical machine hosts, either as images or after instantiation of the VCE. Cloud orchestration module 1341 manages the transfer and storage of images, deploys new instantiations of VCEs and manages active instantiations of VCE deployments. Gateway 1340 is the collection of computer software, hardware, and firmware that allows public cloud 1305 to communicate through WAN 1302.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 1306 is similar to public cloud 1305, except that the computing resources are only available for use by a single enterprise. While private cloud 1306 is depicted as being in communication with WAN 1302, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 1305 and private cloud 1306 are both part of a larger hybrid cloud.

The letter designators, such as i, is used to designate a number of instances of an element may indicate a variable number of instances of that element when used with the same or different elements.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for generating information for an augmented reality display coupled to a visiting user computing device, the computer program product comprising a computer readable storage medium having computer readable program code embodied therein that is executable to perform operations, the operations comprising:
    determining qualifying locales accessible to a visiting user during a user available time from a current location of the visiting user;
    providing values for locale features of the qualifying locales and values of user features in a user profile of the visiting user as input to a locale attraction machine learning module to produce local attraction scores for the qualifying locales indicating measurements of attraction of the qualifying locales to the visiting user, wherein the values for the locale features provide measurable properties of characteristics of the locales;
    forming qualifying groups of qualifying locales from a set of qualifying locales having highest locale attraction scores of the qualifying locales, wherein each group of the qualifying groups has at least one qualifying locale; and
    transmitting, to the visiting user computing device, information on a selected qualifying group of the qualifying groups of locales to cause an augmented reality display to render augmented reality representations of information on the qualifying locales in the selected qualifying group to draw attention of the visiting user toward the qualifying locales of the selected qualifying group.

2. The computer program product of claim 1, wherein the operations further comprise:
    receiving, from the visiting user computing device, indication that the visiting user visited or did not visit qualifying locales for which augmented reality information was rendered in the augmented reality display;
    adjusting a first locale attraction score of a first locale, produced by the locale attraction machine learning module, upward to produce a first adjusted locale attraction score in response to receiving indication the visiting user visited the first locale;
    adjusting a second locale attraction score of a second locale, produced by the locale attraction machine learning module, downward to produce a second adjusted locale attraction score in response to receiving indicating the visiting user did not visit the second locale; and
    training the locale attraction machine learning module to output the first and the second adjusted locale attraction scores from inputs used to produce the first and the second adjusted local attraction scores, respectively.

3. The computer program product of claim 1, wherein the selected qualifying group comprises a first qualifying group, wherein the operations further comprise:
    receiving, from the visiting user, a request for another group of locales;
    selecting a second qualifying group of at least one locale from the qualifying groups; and
    transmitting, to the visiting user computing device, information on the at least one locale in the second qualifying group to render, in the augmented reality display, augmented reality representations of information of the at least one locale in the second qualifying group to draw the attention of the visiting user toward the at least one locale in the second qualifying group.

4. The computer program product of claim 1, wherein the forming qualifying groups comprises:
    determining potential groups of locales having highest of locale attraction scores for the qualifying locales; and
    for each potential group, determining a fastest path to travel to the locales in the potential group and a cumulative time for the potential group comprising a time to travel on the fastest path and average engagement durations at the locales, wherein the qualifying groups comprise potential groups having cumulative times less than the user available time.

5. The computer program product of claim 1, wherein the operations further comprise:
determining an order to visit the qualifying locales in the selected qualifying group according to a fastest path to travel to the qualifying locales, wherein the augmented reality display further renders a representation of the order to visit the qualifying locales in the selected qualifying group.

6. The computer program product of claim 1 wherein the qualifying locales have average user engagement durations less than the user available time, wherein the average user engagement duration is based on an average time a plurality of users previously visited the qualifying locales, wherein the qualifying groups have an aggregation of the average user engagement durations for the qualifying locales in the group that is less than the user available time.

7. The computer program product of claim 6, wherein an average user engagement duration for a qualifying locale is calculated by:
determining similar users having visited the qualifying local within a time period having user profiles that are similar to the user profile of the visiting user according to a similarity measure, wherein the average user engagement duration for the qualifying locale comprises an average of user engagement durations of the similar users at the qualifying locale.

8. The computer program product of claim 6, wherein user engagement durations used in the average user engagement durations for a qualifying locale are weighted greater for users having visited the qualifying locale more recently.

9. The computer program product of claim 1, wherein the augmented reality display comprises a gaze tracking device, wherein the operations further comprise:
receiving information from the visiting user indicating a gazed locale on which the visiting user is gazing that does not comprise one of the locales whose indication is rendered in the augmented reality display;
providing values for locale features of the gazed locale and the values of the user features in the user profile of the visiting user as input to the locale attraction machine learning module to determine a local attraction score for the gazed locale; and
transmitting, to the visiting user computing device, information on the gazed locale to cause the augmented reality display to render in the gaze tracking device a visual representation of the locale attraction score of the gazed locale.

10. The computer program product of claim 1, wherein the values of the locale features provided as input to the locale attraction machine learning module include at least one of a percentage change in an average time users have spent at a qualifying locale and a percentage change in a number of users that have visited the qualifying locale.

11. A system for generating information for an augmented reality display coupled to a visiting user computing device, comprising:
a processor; and
a computer readable storage medium having computer readable program code embodied therein that is executable by the processor to perform operations, the operations comprising:
determining qualifying locales accessible to a visiting user during a user available time from a current location of the visiting user;
providing values for locale features of the qualifying locales and values of user features in a user profile of the visiting user as input to a locale attraction machine learning module to produce local attraction scores for the qualifying locales indicating measurements of attraction of the qualifying locales to the visiting user, wherein the values for the locale features provide measurable properties of characteristics of the locales;
forming qualifying groups of qualifying locales from a set of qualifying locales having highest locale attraction scores of the qualifying locales, wherein each group of the qualifying groups has at least one qualifying locale; and
transmitting, to the visiting user computing device, information on a selected qualifying group of the qualifying groups of locales to cause an augmented reality display to render augmented reality representations of information on the qualifying locales in the selected qualifying group to draw attention of the visiting user toward the qualifying locales of the selected qualifying group.

12. The system of claim 11, wherein the operations further comprise:
receiving, from the visiting user computing device, indication that the visiting user visited or did not visit qualifying locales for which augmented reality information was rendered in the augmented reality display;
adjusting a first locale attraction score of a first locale, produced by the locale attraction machine learning module, upward to produce a first adjusted locale attraction score in response to receiving indication the visiting user visited the first locale;
adjusting a second locale attraction score of a second locale, produced by the locale attraction machine learning module, downward to produce a second adjusted locale attraction score in response to receiving indicating the visiting user did not visit the second locale; and
training the locale attraction machine learning module to output the first and the second adjusted locale attraction scores from inputs used to produce the first and the second adjusted local attraction scores, respectively.

13. The system of claim 11, wherein the forming qualifying groups comprises:
determining potential groups of locales having highest of locale attraction scores for the qualifying locales; and
for each potential group, determining a fastest path to travel to the locales in the potential group and a cumulative time for the potential group comprising a time to travel on the fastest path and average engagement durations at the locales, wherein the qualifying groups comprise potential groups having cumulative times less than the user available time.

14. The system of claim 11, wherein the operations further comprise:
determining an order to visit the qualifying locales in the selected qualifying group according to a fastest path to travel to the qualifying locales, wherein the augmented reality display further renders a representation of the order to visit the qualifying locales in the selected qualifying group.

15. A method for generating information for an augmented reality display coupled to a visiting user computing device, comprising:

determining qualifying locales accessible to a visiting user during a user available time from a current location of the visiting user;

providing values for locale features of the qualifying locales and values of user features in a user profile of the visiting user as input to a locale attraction machine learning module to produce local attraction scores for the qualifying locales indicating measurements of attraction of the qualifying locales to the visiting user, wherein the values for the locale features provide measurable properties of characteristics of the locales;

forming qualifying groups of qualifying locales from a set of qualifying locales having highest locale attraction scores of the qualifying locales, wherein each group of the qualifying groups has at least one qualifying locale; and transmitting, to the visiting user computing device, information on a selected qualifying group of the qualifying groups of locales to cause an augmented reality display to render augmented reality representations of information on the qualifying locales in the selected qualifying group to draw attention of the visiting user toward the qualifying locales of the selected qualifying group.

16. The method of claim 15, further comprising:

receiving, from the visiting user computing device, indication that the visiting user visited or did not visit qualifying locales for which augmented reality information was rendered in the augmented reality display;

adjusting a first locale attraction score of a first locale, produced by the locale attraction machine learning module, upward to produce a first adjusted locale attraction score in response to receiving indication the visiting user visited the first locale;

adjusting a second locale attraction score of a second locale, produced by the locale attraction machine learning module, downward to produce a second adjusted locale attraction score in response to receiving indicating the visiting user did not visit the second locale; and training the locale attraction machine learning module to output the first and the second adjusted locale attraction scores from inputs used to produce the first and the second adjusted local attraction scores, respectively.

17. The method of claim 15, wherein the forming qualifying groups comprises:

determining potential groups of locales having highest of locale attraction scores for the qualifying locales; and for each potential group, determining a fastest path to travel to the locales in the potential group and a cumulative time for the potential group comprising a time to travel on the fastest path and average engagement durations at the locales, wherein the qualifying groups comprise potential groups having cumulative times less than the user available time.

* * * * *